(12) United States Patent
Pan

(10) Patent No.: US 9,175,990 B2
(45) Date of Patent: Nov. 3, 2015

(54) AXIAL-FLOW TYPE IMPEDANCE WATER FLOW SENSOR

(71) Applicant: Zhaokeng Pan, Guangdong (CN)

(72) Inventor: Zhaokeng Pan, Guangdong (CN)

(*) Notice: Subject to any disclaimer, the term of this patent is extended or adjusted under 35 U.S.C. 154(b) by 85 days.

(21) Appl. No.: 14/352,651

(22) PCT Filed: Oct. 17, 2012

(86) PCT No.: PCT/CN2012/083088
§ 371 (c)(1),
(2) Date: Jul. 17, 2014

(87) PCT Pub. No.: WO2013/056648
PCT Pub. Date: Apr. 25, 2013

(65) Prior Publication Data
US 2014/0318267 A1 Oct. 30, 2014

(30) Foreign Application Priority Data
Oct. 18, 2011 (CN) .......................... 2011 1 0316683

(51) Int. Cl.
*G01F 15/00* (2006.01)
*G01F 1/10* (2006.01)
(Continued)

(52) U.S. Cl.
CPC *G01F 1/10* (2013.01); *G01F 1/115* (2013.01); *G01F 1/56* (2013.01)

(58) Field of Classification Search
CPC ............. G01F 15/00; G01F 1/30; G01F 1/10; G01F 1/05; G08C 19/10
USPC ............... 73/861.77, 861.73, 861.91, 861.79; 340/870.37
See application file for complete search history.

(56) References Cited

U.S. PATENT DOCUMENTS

| 4,333,354 A | 6/1982 | Feller |
| 4,790,195 A * | 12/1988 | Feller ........................ G01F 1/10 73/861.08 |
| 4,829,833 A | 5/1989 | Feller |

(Continued)

FOREIGN PATENT DOCUMENTS

| CN | 85202918 | 7/1986 |
| CN | 2482088 | 3/2002 |

(Continued)

*Primary Examiner* — Jewel V Thompson
(74) *Attorney, Agent, or Firm* — McDonnell Boehnen Hulbert & Berghoff LLP

(57) ABSTRACT

An axial-flow type impedance water flow sensor comprises a water wheel (3), a cyclone (4), a metal detection needle (7) and a detection circuit. The cyclone (4) is mounted at a water inlet side (5) of a water pipe (1), a bracket (2) is mounted at a water outlet side (6) of the water pipe (1), and the water wheel (3) is movably mounted between the bracket (2) and the cyclone (4). The water wheel (3) is provided with at least two blades (3-2) that are arranged uniformly. An upper end portion and a lower end portion (3-1, 3-4) of a rotation shaft of the water wheel (3) are fixedly connected to a center of the bracket (2) and a center of the cyclone (4) respectively through a bearing. A metal detection needle (7) is mounted on a wall of the water pipe corresponding to the water wheel (3), and has one end surface located on an inner wall surface of the water pipe (1) and the other end being connected to a signal input end of the detection circuit. The axial-flow type impedance water flow sensor can accurately detect the water flow without being affected by the water quality and impurities in the water. Moreover, less wear occurs between the shaft of the water wheel and the bearing, and the water wheel has low inertia and low cost.

8 Claims, 2 Drawing Sheets

(51) Int. Cl.
*G01F 1/115* (2006.01)
*G01F 1/56* (2006.01)

(56) References Cited

U.S. PATENT DOCUMENTS

| | | | | |
|---|---|---|---|---|
| 5,381,698 A | * | 1/1995 | Wiley | G01F 1/106 |
| | | | | 340/870.37 |
| 5,392,657 A | * | 2/1995 | Feller | G01F 1/106 |
| | | | | 340/870.37 |
| 6,250,167 B1 | * | 6/2001 | Peace | G01F 1/115 |
| | | | | 204/606 |
| 6,257,073 B1 | * | 7/2001 | Lee | G01F 1/10 |
| | | | | 73/861.77 |
| 6,486,683 B1 | * | 11/2002 | Nussbaum | G01D 5/24 |
| | | | | 324/668 |
| 2008/0065006 A1 | * | 3/2008 | Roger | A61M 1/16 |
| | | | | 604/65 |

FOREIGN PATENT DOCUMENTS

| | | |
|---|---|---|
| CN | 201173802 | 12/2008 |
| CN | 102506945 | 6/2012 |
| JP | 1-178819 | 7/1989 |

\* cited by examiner

AXIAL-FLOW TYPE IMPEDANCE WATER FLOW SENSOR

TECHNICAL FIELD

The present invention relates to a water flow sensor, and particularly to an axial-flow type impedance water flow sensor.

BACKGROUND

Nowadays, water flow sensors provided on tankless gas water heater for detecting water flow include mainly ones of axial-flow type and ones of lateral-flow type. Both of them are configured to detect water flow by a Hall element in accordance with pulse signal generated due to polarity change of a magnet, while a position of the magnet is variable with rotation of a blade wheel impelled by water.

The axial-flow type water flow sensor is provided at a water inlet with a cyclone formed by a plurality of turbine-like fixed blades. One-way flow of water through the cyclone is converted into a rotational flow, which brings magnetic blades of a water wheel into rotation, while a Hall element is configured to detect the water flow in accordance with pulse signal generated due to polarity change of the magnetic blades. This type of water flow sensor has advantages including: there is a good linear relation between the water flow and a rotational speed of the magnetic blades, while the rotational speed is stable; the blade wheel is under uniform stress in radial direction, and is merely under impelling stress from waterflow in axial direction, thus there may be a small radial wear between a shaft of the blade wheel and a bearing after long-term use, while an axial wear may not cause adverse effects on an operation thereof since there is enough wear allowance remained on an upper bearing of the rotational shaft of the blade wheel, which guarantees a long lifespan and a stable operation. However, disadvantages of this type of water flow sensor includes: irony impurities in tap water may be adhered to the magnetic water wheel; even if providing a high-strength magnet at the water inlet to make an attempt to remove ferromagnetic impurities from the water, a lot of irony impurities may still be adhered to the magnetic water wheel after long term operation, so that the water wheel may be jammed and unable to run smoothly. Meanwhile, a thickness of the blade of the magnetic water wheel is required to be more than 2 mm, thus there may be a relative large impact force in axial direction applied on the water wheel by water during operation.

The lateral-flow type water flow sensor is provided with a passage for water inflow and outflow at one side of blades of a water wheel, and the water wheel is rotated by impact from the waterflow. A magnet located at another side of a shaft of the water wheel and separated from the water wheel is brought into rotation by the water wheel, while a Hall element may detect a water flow according to polarity change of the magnet which is in synchronous rotation with the water wheel. Its advantage lies in that the magnet can be separated from the water wheel and the water passage. However, a linear relation between a rotation speed of the water wheel and a water flow is not good enough, so that detection accuracy may be affected. Moreover, since the blades of the water wheel are impelled by the waterflow from a single side, wear may be apt to occur between the shaft of the water wheel and a bearing which largely suffer from force in radial direction of the water wheel, and thus the lifespan may be shortened.

For those two types of water flow sensors mentioned above, the water wheel thereof may have its mass increased due to presence of the magnet, and the inertia may be increased, thus a response speed to a transient variation of the water flow may be decreased.

SUMMARY

It is an object of the present invention to provide an axial-flow type impedance water flow sensor without using any magnet or Hall element as a signal detection device to detect a water flow, which is able to detect the water flow accurately without being affected by water quality or impurities in the water, and in which wear between a shaft of a water wheel and a bearing may be small, while the inertia of the water wheel may be small and the cost thereof may be low.

The present invention provides technical solution as following.

There is provided an axial-flow type impedance water flow sensor, which is mounted in a water pipe containing a fluid. The axial-flow type impedance water flow sensor comprises a water wheel, a metal detection needle, and a detection circuit. The water wheel is rotatably mounted in the water pipe, and is provided with at least two blades that are arranged uniformly. The metal detection needle is mounted on a wall of the water pipe corresponding to the water wheel, and an end surface of the metal detection needle is located on an inner wall surface of the water pipe, while another end of the metal detection needle is connected with a signal input end of the detection circuit.

The axial-flow type impedance water flow sensor further comprises a cyclone, the cyclone is mounted at a water inlet side of the water pipe, and a bracket is mounted at a water outlet side of the water pipe; the water wheel is rotatably mounted between the bracket and the cyclone, an upper end portion of a rotation shaft of the water wheel is rotatably connected with a center of the bracket via a bearing, and a lower end portion of the rotation shaft of the water wheel is rotatably connected with a center of the cyclone via a bearing.

A central axis line of the rotation shaft of the water wheel, a central axis line of the cyclone, and a central axis line of the bracket coincide with a central axis line of the water pipe.

A number of the blades of the water wheel is 2 to 20. Each of the blades of the water wheel is provided with a groove at its middle part. An outer end surface in radial direction of each of the blades of the water wheel is formed into an arc surface, while a gap of 0.2 to 2 mm exists between the arc surface and an arc surface of inner wall of the water pipe, and each of the blades of the water wheel has a thickness of 0.5 to 1.5 mm.

The detection circuit comprises an oscillating circuit, a voltage divider, and a detection comparison circuit; the voltage divider consists of a water resistance between the metal detection needle and the blade of the water wheel, and a divider resistor; an output end of the oscillating circuit having an output frequency of 3 KHz to 50 KHz is connected with an end of the divider resistor of the voltage divider; a divider node is located between the water resistance and the divider resistor, and is connected with an input end of the detection comparison circuit; and a blocking capacitor is connected between the divider resistor and the metal detection needle.

The cyclone is provided with a group of turbine-like blades that are arranged uniformly. The water pipe and/or the water wheel are made of insulating plastic material.

When the outer arc surface in radial direction of the blade of the water wheel is rotated to a position corresponding to the metal detection needle, the water resistance of the gap reaches to a maximum value. As the blade is rotated away from the metal detection needle gradually, the water resistance between the detection needle and the blade may taper off.

When the detection needle is positioned intermediately between two adjacent blades, the water resistance reaches to a minimum value. Therefore, when the water wheel is rotated, once a blade is rotated away, the water resistance thereof may experience a process including a decrease at first and then an increase. The above mentioned changing process of the water resistance may be reflected fully by a voltage change of division voltage at a node of the voltage divider, while an amount of the voltage change may be input to and processed by the detection comparison circuit to obtain a corresponding electric pulse signal.

In order to prevent the metal detection needle from being affected by electrochemical corrosion, an oscillating signal of 3 KHz~50 KHz output from the oscillating circuit may pass through the blocking capacitor to be transmitted to the metal detection needle, so that there is no direct current component flowing through the metal detection needle as for water, thereby the metal detection needle can be free from electrochemical corrosion.

As compared to the prior arts, the present invention has notable effects as following.

(1) The blade of the water wheel in the present invention has a thickness much less than a thickness of the blade of the water wheel in the axial-flow type water flow sensor described above, and has its middle part hollowed, so the water wheel may suffer a small resistance force in axial direction, may have a small mass and small inertia, a better linearity between the water flow and the rotation speed of the water wheel, a stable operation, a small wear between the rotation shaft of the water wheel and the bearing, and a long life span, and may prevent the bearing from being apt to wear and prevent the linearity between the water flow and the rotation speed of the water wheel from being not good enough due to the impact in radial direction from water applied between the rotation shaft of the water wheel and the bearing in the lateral-flow type water flow sensor.

(2) The present invention is implemented without using any magnet or Hall element as a signal detection device to detect the water flow. In this way, cost may be saved, and irony impurities in water may be prevented from being attached by the magnet, so that the detection process may be free from influence of water quality and the impurities in the water. Since the water wheel is made of plastic, its mass and inertia may be small while the sensitivity may be high.

The present invention is applicable to detect water flow in water pipe, and particularly suitable for accurate detection of water flow in thermostatic type tankless gas water heater.

DETAILED DESCRIPTION

The present invention will be described in further details through the following embodiments.

Figure 1:
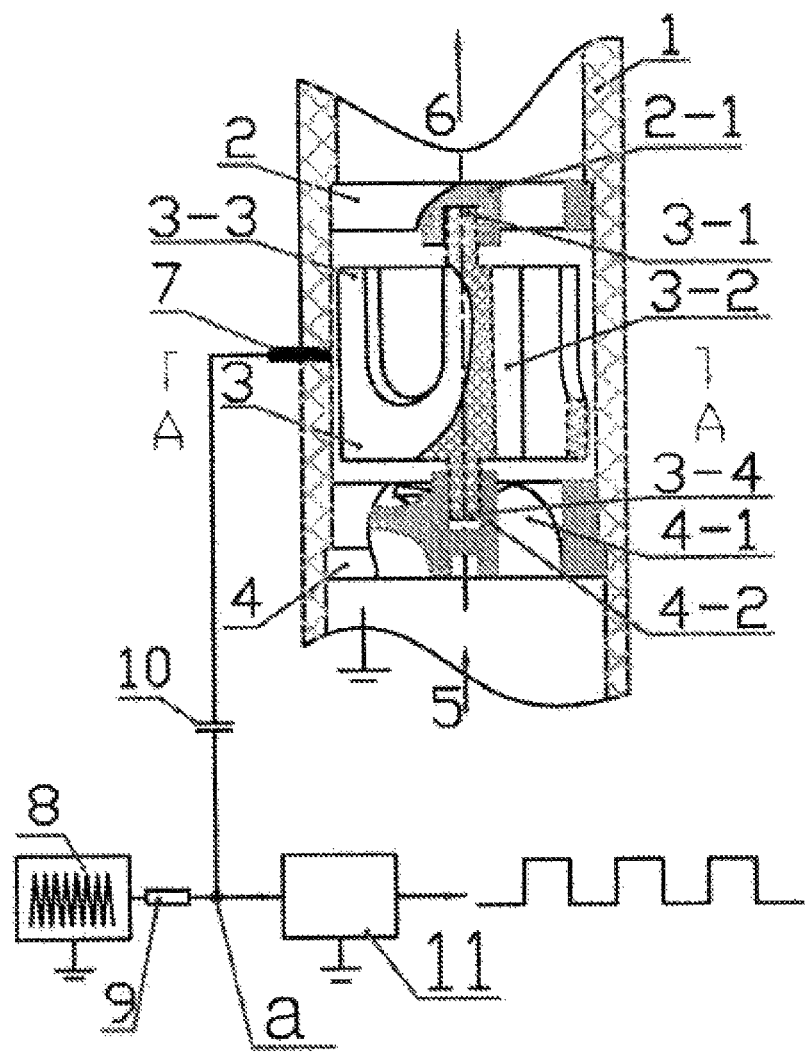
FIG. 1 is a structural diagram of an axial-flow type impedance water flow sensor according to an embodiment of the present invention.
Figure 2:
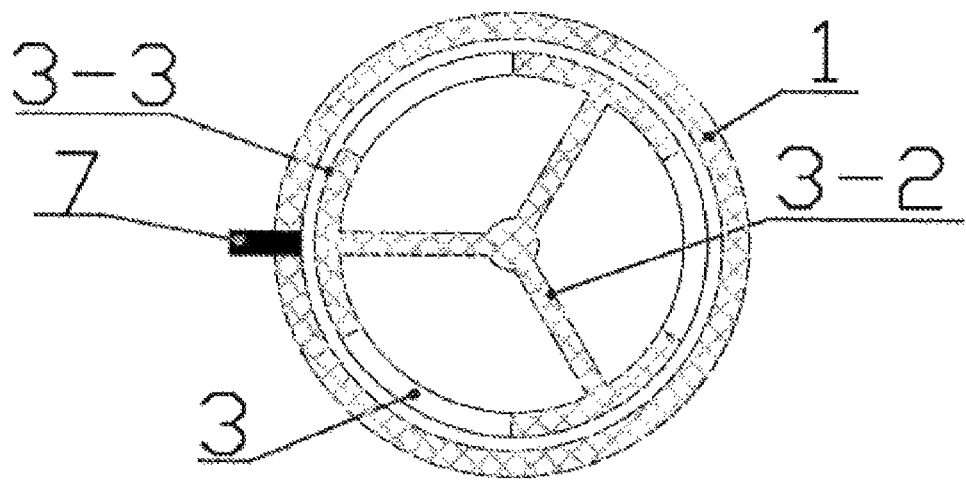
FIG. 2 is a sectional view along line A-A in FIG. 1.

FIG. 1 is a structural diagram of an axial-flow type impedance water flow sensor according to an embodiment of the present invention, and FIG. 2 is a sectional view along line A-A in FIG. 1. Referring to FIGS. 1-2, an axial-flow type impedance water flow sensor mounted in a plastic water pipe 1 consists of a water wheel 3, a cyclone 4, a metal detection needle 7 and a detection circuit. The cyclone 4 is mounted fixedly at a water inlet side 5 in the insulating plastic water pipe 1, a bracket 2 is mounted fixedly at a water outlet side 6 of the water pipe 1, and the water wheel 3 is mounted between the bracket 2 and the cyclone 4. The water wheel 3 is provided with three blades 3-2 that are arranged uniformly. An upper end portion 3-1 of a rotation shaft of the water wheel 3 is rotatably connected with a center of the bracket 2 via an upper bearing 2-1, a lower end portion 3-4 of the rotation shaft is rotatably connected with a center of the cyclone 4 via a lower bearing 4-2, and central axial lines of the rotation shaft of the water wheel 3, of the cyclone 4, and of the bracket 2 coincide with a central axial line of the water pipe 1. The metal detection needle 7 is mounted on a pipe wall of the water pipe 1 corresponding to middle part of the blades 3-2 of the water wheel, and an end surface of the metal detection needle 7 is located on an inner wall surface of the water pipe 1, while another end of the metal detection needle 7 is connected with a signal input end of the detection circuit.

The water wheel 3 may include 2 to 20 blades that are arranged uniformly, and the water wheel 3 includes 3 blades in this embodiment. In order to reduce mass, the water wheel 3 may be made of plastic, and may have each one of the blades 3-2 hollowed into a groove at its middle part, so as to reduce inertia, improve sensitivity, and lower cost. An outer end surface in radial direction of the blade 3-2 of the water wheel may be formed into an arc surface 3-3, a gap of 0.2 to 2 mm, and of 0.6 mm in this embodiment, exists between the arc surface 3-3 and an arc surface of inner wall of the insulating plastic water pipe 1, and the blade 3-2 of the water wheel has a thickness of 0.5 to 1.5 mm, and of 0.8 mm in this embodiment. The cyclone 4 is provided therein with a group of turbine-like blades 4-1 that are disposed uniformly.

The detection circuit consists mainly of an oscillating circuit 8, a voltage divider, and a detection comparison circuit 11. The voltage divider is composed of a water resistance between the metal detection needle 7 and the blades 3-2 of the water wheel, and a divider resistor 9. The oscillating circuit 8 has an output frequency of 3 KHz to 50 KHz. In this embodiment, an oscillating signal of 30 KHz is output from the oscillating circuit 8 to the divider resistor 9. There is a divider node $\alpha$ between the water resistance and the divider resistor 9, and the divider node $\alpha$ is connected with an outer end of the metal detection needle 7 via a blocking capacitor 10. An input end of the detection comparison circuit 11 is connected with the node $\alpha$. A resistance of the divider resistor 9 is selectively set as 75 K$\Omega$. The detection circuit and water in the insulating water pipe 1 are commonly grounded.

During operation, when water flows into the insulating water pipe 1 from its inlet side 5, the water flows through the cyclone 4 while being rotated around the axle center of the cyclone 4 and brings the water wheel 3 into rotation. Before and after the blades 3-2 of the water wheel 3 pass through the metal detection needle 7, there will be an apparent periodical change in the water resistance between the metal detection needle 7 and the blades 3-2. Such a change may be represented by a voltage change at the node a of the voltage divider. In this way, a pulse signal reflecting a rotation condition of the water wheel 3 may be output after being processed by the detection comparison circuit 11, and a frequency of the pulse signal is in direct proportion to the water flow inside the water pipe 1.

Although the present invention has been described with reference to some typical embodiments, it should be understood that the terms used in description are only illustrative and exemplary rather than for limitation. Since the present invention may be embodied in many forms without departing from spirit or essence of the invention, it should be understood that the embodiments described above are not limited to any aforementioned details, but should be interpreted broadly within the spirit and scope defined by appended claims. Therefore, all variations and modifications that fall within the scope of claims and the equivalents thereof should be covered by the appended claims.

What is claimed is:

1. An axial-flow type impedance water flow sensor, mounted in a water pipe containing a fluid, wherein,
   the axial-flow type impedance water flow sensor comprises a water wheel, a metal detection needle, and a detection circuit;
   the water wheel is rotatably mounted in the water pipe, and is provided with at least two blades that are arranged uniformly; and
   the metal detection needle is mounted on a wall of the water pipe corresponding to the water wheel, and an end surface of the metal detection needle is located on an inner wall surface of the water pipe, while another end of the metal detection needle is connected with a signal input end of the detection circuit;
   the axial-flow type impedance water flow sensor further comprises a cyclone, the cyclone is mounted at a water inlet side of the water pipe, and a bracket is mounted at a water outlet side of the water pipe; the water wheel is rotatably mounted between the bracket and the cyclone, an upper end portion of a rotation shaft of the water wheel is rotatably connected with a center of the bracket via a bearing, and a lower end portion of the rotation shaft of the water wheel is rotatably connected with a center of the cyclone via a bearing; and
   the detection circuit comprises an oscillating circuit, a voltage divider, and a detection comparison circuit;
   the voltage divider consists of a water resistance between the metal detection needle and the blade of the water wheel, and a divider resistor;
   an output end of the oscillating circuit having an output frequency of 3 KHz to 50 KHz is connected with an end of the divider resistor of the voltage divider;
   a divider node is located between the water resistance and the divider resistor, and is connected with an input end of the detection comparison circuit; and
   a blocking capacitor is connected between the divider resistor and the metal detection needle.

2. The axial-flow type impedance water flow sensor according to claim 1, wherein, a central axis line of the rotation shaft of the water wheel, a central axis line of the cyclone, and a central axis line of the bracket coincide with a central axis line of the water pipe.

3. The axial-flow type impedance water flow sensor according to claim 1, wherein, a number of the blades of the water wheel is 2 to 20.

4. The axial-flow type impedance water flow sensor according to claim 1 wherein, each of the blades of the water wheel is provided with a groove at middle part thereof.

5. The axial-flow type impedance water flow sensor according to claim 1, wherein, an outer end surface in radial direction of each of the blades of the water wheel is an arc surface, a gap of 0.2 to 2 mm exists between the arc surface and an arc surface of an inner wall of the water pipe, and each of the blades of the water wheel has a thickness of 0.5 to 1.5 mm.

6. The axial-flow type impedance water flow sensor according to claim 1, wherein, the cyclone is provided with a group of turbine-like blades that are arranged uniformly.

7. The axial-flow type impedance water flow sensor according to claim 1, wherein, the water pipe and/or the water wheel are made of insulating plastic material.

8. The axial-flow type impedance water flow sensor according to claim 2, wherein, each of the blades of the water wheel is provided with a groove at middle part thereof.

* * * * *